United States Patent
Bergeron et al.

(10) Patent No.: US 6,947,431 B1
(45) Date of Patent: Sep. 20, 2005

(54) WIRELESS DATA COMMUNICATIONS WITH HEADER SUPPRESSION AND RECONSTRUCTION

(75) Inventors: Yvon Bergeron, Varennes (CA); Steve Hamel, Delson (CA); Richard Girardin, St-Hubert (CA)

(73) Assignee: Radio IP Software Inc., Montreal (CA)

( * ) Notice: Subject to any disclaimer, the term of this patent is extended or adjusted under 35 U.S.C. 154(b) by 863 days.

(21) Appl. No.: 09/643,729

(22) Filed: Aug. 23, 2000

(51) Int. Cl.⁷ .............................................. H04L 12/28
(52) U.S. Cl. ....................... 370/401; 370/338; 370/351
(58) Field of Search ................................ 370/351, 352, 370/353, 354, 355, 356, 357, 358, 360, 361, 370/389, 390, 392, 393, 394, 237, 238, 252, 370/312, 315, 321, 328, 331, 338, 339, 340, 370/349, 381, 400, 401, 409–412, 419, 422, 370/427, 429, 466, 474, 467; 455/416, 555; 709/100, 103, 202, 206, 217, 219, 220, 223, 709/227, 229, 230, 236, 245, 249, 310

(56) References Cited

U.S. PATENT DOCUMENTS

| | | | |
|---|---|---|---|
| 5,239,466 A | | 8/1993 | Morgan et al. |
| 5,684,954 A | * | 11/1997 | Kaiserswerth et al. ...... 709/236 |
| 5,717,737 A | | 2/1998 | Doviak et al. |
| 5,802,285 A | | 9/1998 | Hirviniemi |
| 5,838,905 A | | 11/1998 | Leigh |
| 5,867,661 A | | 2/1999 | Bittinger et al. |
| 5,948,066 A | | 9/1999 | Whalen et al. |
| 6,006,261 A | | 12/1999 | Ratcliff et al. |
| 6,021,433 A | | 2/2000 | Payne et al. |
| 6,130,892 A | * | 10/2000 | Short et al. .................. 370/401 |
| 6,172,981 B1 | * | 1/2001 | Cox et al. .................... 370/401 |
| 6,198,920 B1 | | 3/2001 | Doviak et al. |
| 6,249,516 B1 | * | 6/2001 | Brownrigg et al. ......... 370/338 |
| 6,289,390 B1 | * | 9/2001 | Kavner ........................ 709/310 |
| 6,330,599 B1 | * | 12/2001 | Harvey ........................ 709/223 |
| 6,347,340 B1 | | 2/2002 | Coelho et al. |
| 6,397,259 B1 | * | 5/2002 | Lincke et al. ................ 709/236 |
| 6,415,330 B1 | * | 7/2002 | Okanoue ..................... 709/245 |
| 6,427,173 B1 | * | 7/2002 | Boucher et al. ............. 709/238 |
| 6,434,141 B1 | * | 8/2002 | Oz et al. ...................... 370/352 |
| 6,460,085 B1 | * | 10/2002 | Toporek et al. .............. 709/233 |
| 6,584,083 B1 | * | 6/2003 | Toporek et al. .............. 370/316 |
| 6,590,896 B1 | * | 7/2003 | Schrodi et al. ......... 370/395.52 |
| 6,618,397 B1 | * | 9/2003 | Huang ......................... 370/474 |
| 6,667,974 B1 | * | 12/2003 | Shigeta ........................ 370/389 |
| 6,697,345 B1 | * | 2/2004 | Corrigan et al. ............. 370/330 |

OTHER PUBLICATIONS

IP-Radio Access Network, Nokia's vision for an IP based architecture for Radio Access Networks, pp 3-11 (www.nokia.com).
Nokia C110 Wireless LAN Card, pp1-2, http://www.nokia.com/corporate/wlan/card_c110.html, Aug. 14, 2000.
Nokia Wireless LAN Technical Overview pp1-2, http://www.nokia.com/corporate/wlan/tech.html, Aug. 14, 2000.
Nokia Wireless LAN IP security, pp1-2, http://www.nokia.com/corporate/wlan/security.html, Aug. 14, 2000.
Nokia C020, C021, specifications, pp1-2, http://www.nokia.com, Aug. 14, 2000.
Nokia A020 Wireless LAN Access Point for entreprises, specification, pp1-2, http://www.nokia.com, Aug. 14, 2000.

* cited by examiner

*Primary Examiner*—Phirin Sam
(74) *Attorney, Agent, or Firm*—Ogivy Renault (57) ABSTRACT

A gateway for a wireless network. The gateway allows any wireless device to communicate using the Internet Protocol. The radio gateway works as an agent between the NDIS layer and the wireless network. The gateway removes the TCP/IP header and adds its own header.

16 Claims, 7 Drawing Sheets

| 160 | 161 | 162 |
|---|---|---|
| ID NUMBER | TCP/IP ADDRESS | PHYSICAL ADDRESS |
| 1001 | 203.204.205.206 | 123456789 |

| 163 | 164 | 165 | 166 |
|---|---|---|---|
| Sub ID | DEST TCP/IP ADDRESS | SOURCE PORT | DEST PORT |
| 0001 | 204.25.23.2 | 1014 | 23 |
| 0002 | 128.52.3.54 | 1020 | 21 |

FIG7

WIRELESS DATA COMMUNICATIONS WITH HEADER SUPPRESSION AND RECONSTRUCTION

FIELD OF THE INVENTION

The present invention relates to wireless data communications with header suppression and reconstruction, and in particular to a network gateway and a wireless terminal communications manager. More precisely, this invention describes a TCP/IP wireless gateway for enabling mobile users to have its own IP address.

BACKGROUND OF INVENTION

No one can anymore doubt about the increase of wireless communications between individuals. Meanwhile, if a lot of work has been done in the field of cellular communications, lots remains to be done in wireless communications involving data. In fact, it is important for a mobile user to be able to wireless communicate using his computer and a cellular phone for instance. Several solutions exists already. Meanwhile, they suffer from various limitations.

For instance, there exists wireless LAN cards (NOKIA C110 Wireless LAN card for instance) which uses PCMCIA interface to access a wireless LAN. This type of card suffers from a few limitations. The user must use the frequency of the LAN card to communicate with a hub and therefore the user cannot use his own radio system to transfer data. In the case of the NOKIA system, the typical range indoors is 30/90 m.

Furthermore, the system uses a Dynamic Host Configuration Protocol (DHCP) meaning that the IP address of the mobile is not static. This can be a serious drawback when the user wants to access a service where part of the authentification is done using a fixed IP address rather than a range of IP addresses. The encryption of the data is done using an up to 128-bit key (using Wired Equivalent Privacy protocol). It would be interesting to use any type of encryption scheme.

Another prior art technique is the use of a cellular modem in the case of an analog cellular protocol, such as AMPS. The cellular modem is usually a PCMCIA type card that the user will insert in the mobile computer. This cellular modem is then connected to a cellular telephone allowing the mobile computer to be connected to the analog cellular network. In the case of a digital cellular network, a modem is not necessary as the computer and the phone both work in digital mode. Only Terminal Adapter Equipment (TAE) is required to link the cellular phone to the computer. An Infra Red (IR) interface can be used to do so in the case that the mobile computer and the mobile are both IR compliant. In both cases, the user can then access, using the dial-up link, a data network. For instance, the user can connect to an ISP to obtain either a static or a dynamic IP address depending on the user's account. The user can also connect to his office using NetBEUI protocol. While the radio protocol has specific compression/encryption schemes, no compression/encryption procedure is done prior to the transmission of the data over the cellular phone. This is a serious issue, especially if the cellular transmission is intercepted.

Therefore there is a need for an architecture that will avoid the shortcomings of the relevant prior art.

SUMMARY OF INVENTION

It is an object of the present invention to provide a gateway that can link a group of wireless users using the TCP/IP protocol.

Another object of the present invention is to provide static IP addresses for each wireless users of a network.

It is another object of the invention to provide a minimisation of the packet overhead used to communicate between wireless users.

Yet another object of the invention is to provide a compression of the packet used to communicate between the wireless users.

Yet another object of the invention is to encrypt the packets used to communicate between the wireless users.

Yet another object of the invention is to maintain a list of the actives mobile users in a radio network.

Yet another object of the invention is to keep track of and to protect all packets used by the wireless users to communicate.

Yet another object of the invention is to be able to broadcast information to all mobile users of a wireless network.

Yet another object of the invention is to compile communication statistics related to wireless users.

According to one aspect of the invention, there is provided a gateway for transmitting data packets between a wireless network and a second network, the gateway comprising a database comprising data associating at least one wireless terminal with at least one destination address, the data including for each of at least one wireless terminal at least one wireless terminal identifier, at least one source address of the wireless terminal according to a protocol of the second network, and at least one destination address on the second network, a database manager collecting information from the data packets received from at least one wireless terminal in order to build up and maintain the database, a header builder receiving data packets from the wireless network without a header suitable for the protocol of the second network and building the suitable header based on the data and information contained within the data packets received, and outputting data packets with the suitable header for transmission on the second network and a relay module receiving data packets from the second network addressing at least one wireless terminal according to an address associated with the second network, the relay module retransmitting the data packets from the second network to at least one wireless terminal using an address obtained from the database in a format of a protocol of the wireless network.

According to another aspect of the invention, there is provided a wireless terminal for transmitting wireless packets over a wireless network, the wireless terminal comprising a header manager transmitting header information for a particular destination on a second network, and the wireless packets to the wireless network without a header suitable for a protocol used on a second network, a memory comprising data representing header information concerning at least one second network terminal, a memory manager collecting information from the wireless packets received from the wireless network in order to build up and maintain the memory, a relay module collecting the data packets, not having a header suitable for the protocol, from the wireless network to build a data packet with a header suitable for the protocol using the data.

According to another aspect of the invention, there is provided a method for sending a data packet from a wireless terminal to a second network via a wireless network, the method comprising the steps of sending header information from the wireless terminal, removing the header of the data packet to provide a data part of the data packet, adding to the data part of the data packet a wireless header to provide a wireless packet, transmitting the wireless packet over then wireless network, receiving the wireless packet and removing the wireless header of the wireless packet to provide the data part of the wireless packet, creating a header for the data part using the header information received and according to a protocol of the second network, adding the header created to the data part of the wireless packet to provide a new packet, and sending the new packet on the second network.

According to another aspect of the invention, there is provided a method for sending a data packet from a second network to a wireless terminal via a wireless network, the method comprising the steps of sending header information from the second network to the wireless terminal, removing the header of the data packet to provide a data part of the data packet, adding to the data part of the data packet a wireless header to provide a wireless packet, transmitting the wireless packet over the wireless network, receiving the wireless packet and removing the wireless header of the wireless packet to provide the data part of the wireless packet, creating a header for the data part using the header information received by the wireless terminal and according to a protocol used at the wireless terminal, and adding the header created to the data part of the wireless packet to provide a new packet in the protocol.

BRIEF DESCRIPTION OF THE DRAWINGS

The invention will be better understood by an examination of the following description, together with the accompanying drawings, in which.

PREFERRED EMBODIMENT

While the present invention may be provided in various embodiments, there is shown in the drawings and described in the following text a specific preferred embodiment, with the understanding that the present description is only one embodiment and is not limiting of the scope of the invention.

Figure 1:
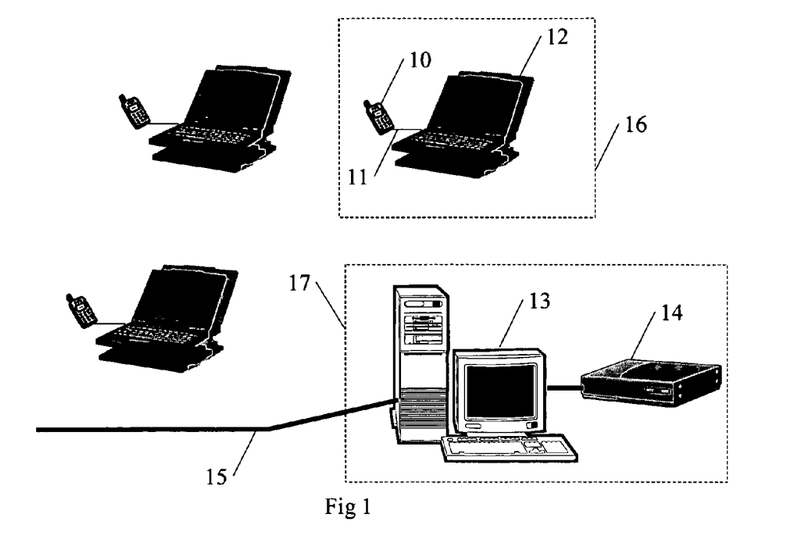
FIG. 1 shows an overview of a wireless network using the invention; a group of mobile units can communicate with a server which acts as a gateway to a remote server.

FIG. 1 illustrates one embodiment of the invention. The system, in the preferred embodiment is a gateway that allows TCP/IP communications between wireless users. More precisely, in the preferred embodiment of the invention, a wireless network comprises a server node 17 and several client nodes 16. In the preferred embodiment, the network can be an ARDIS network. In this example, there are three client nodes 16. Each client node 16 comprises a mobile computer 12 and a radio system 10 that is, in the preferred embodiment, a cellular phone. Each radio system 10 is connected to a mobile computer 12 via a cable 11. The server node 17 comprises a server computer 13, a radio transceiver 14 and a connection to another network 15. In the preferred embodiment the link 15 to a foreign network is a cable. It can also be a wireless connection. In the preferred embodiment each client node 16 is able to communicate with the server node 17. In the preferred embodiment, the server computer 13 is an Intel Pentium II running at 350 MHz, with 128 MB of Random Access Memory (RAM) and 3 GB of hard drive space. In the preferred embodiment, the server computer 13 runs under Microsoft Windows NT4.0. In the preferred embodiment, the mobile computer is an Intel Pentium running at 133 MHz with 32 MB of RAM which runs under Microsoft Windows 98 or Microsoft Windows NT4.0.

General Description

Figure 2:
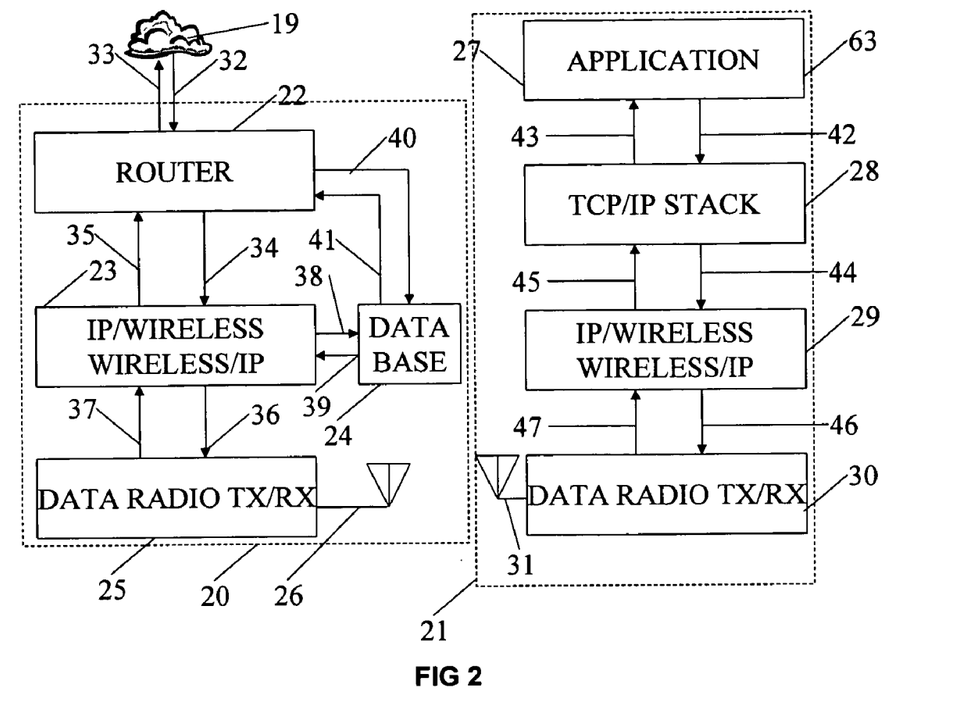
FIG. 2 shows the functional architecture of the invention; the invention comprises a wireless gateway connected to another network and a mobile client.

Now referring to FIG. 2, the complete architecture of the system is disclosed. A mobile unit 21 is able to communicate with a network 19 using a wireless gateway 20.

The mobile unit 21 comprises a TCP/IP application 27 which is either a client application or a server application. A client application could be a telnet application, while a server application could be a Web Server application such as Apache web server. The mobile unit 21 also comprises a TCP/IP stack 28 whose goal is to ultimately create TCP/IP packets. The mobile unit 21 also comprises an IP/WIRELESS, WIRELESS/IP translator 29 whose goal is to at least convert, according to a specific scheme, an IP packet into a wireless packet in the case of an outgoing communication or a wireless packet into an IP packet in the case of an incoming packet. The mobile unit 21 also comprises a data-radio transceiver 30 which can either receive information from an antenna 31 in the case of an incoming signal, or send information to an antenna 31 in the case of an outgoing signal.

The gateway 20 allows a mobile unit 21 to communicate with another mobile unit 21 of the same wireless network. The gateway 20 also allows a mobile unit 21 to communicate with at least one computer located in a part or a sub part of the network 19. The gateway 20 also allows at least one computer located in a part or a sub part of the network 19 to communicate with at least one mobile unit 21 from the wireless network.

Figure 7:
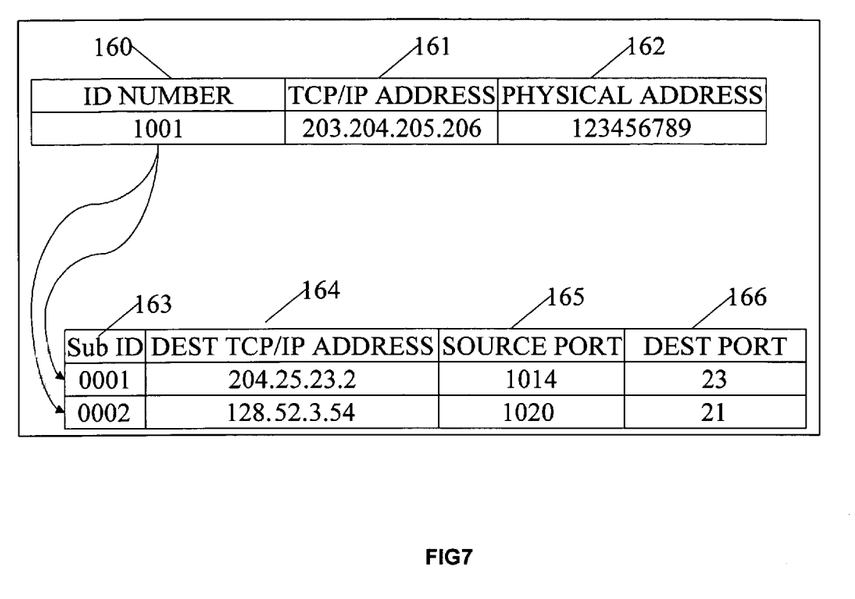
FIG. 7 shows an embodiment of the database which comprised ID numbers and Sub ID numbers.

The gateway 20 comprises a router whose goal is to route incoming and outgoing traffic. More precisely, the router can allow at least one computer located in a part or a sub part of the network 19 to communicate with at least one mobile unit 21. The router 22 accesses a database 24 which contains information concerning the active mobile units 21 with their physical address, their TCP/IP related information, their Identification Number (ID) and their Sub Identification Number (Sub ID). An entry of the database 24 is shown in FIG. 7. An ID number 160 is linked to at least a TCP/IP address 161 and a physical address 162. This ID number 160 can also be linked to Sub ID numbers 163, these Sub ID numbers are linked to at least destination TCP/IP address 164. These Sub ID numbers are also linked with the source port 165 and the destination port 166 used for the communication. The router 22 is also connected to an IP/WIRELESS, WIRELESS/IP translator 23. The goal of the IP/WIRELESS, WIRELESS/IP translator 23 is to at least convert, according to a specific scheme, an IP packet into a wireless packet in the case of an outgoing communication or a wireless packet into an IP packet in the case of an incoming packet according to the database 24. The IP/WIRELESS, WIRELESS/IP translator 23 is connected to a data-radio transceiver 25 which can either receive information from an antenna 26 in the case of an incoming signal, or send information to an antenna 26 in the case of an outgoing signal.

Header Translation

Connection of a Mobile User 21 to the Wireless Network

In order to communicate in the wireless network, a mobile user 21 has an ID number. This ID number is given by the gateway during the first connection of the mobile user 21 to the gateway 20.

More precisely, during the first connection to the gateway 20, the mobile user 21 send its hardware address which is unique and the desired IP address. Upon reception of this unique wireless packet (step 121 FIG. 5) which comprises the hardware address and in the case that the choice of the IP address is feasible (i.e. the IP address is not already taken), the mobile user 21 is given an ID number (step 123 FIG. 5). In the preferred embodiment, this ID number is not static meaning that it is not fixed. This ID number and the received hardware address of the mobile user 21 are stored into database 24 (step 124 FIG. 5).

The ID number is sent to the mobile unit 21 (step 125 FIG. 5) and stored in the memory of the IP/WIRELESS, WIRELESS/IP translator 29. A group of Sub ID numbers are linked to a specific ID number. The Sub ID numbers refer to a specific connection (i.e. one link between two peer users). While the ID number corresponds to a specific mobile unit connected, the combination between an ID number and a Sub ID number refers to a unique connection between a mobile unit 21 and a TCP/IP user.

Process to Send Information from a Mobile Unit

A mobile unit 21 with an application 27 is willing to communicate with another computer located either in the wireless network or in the network 19. The application 27 sends information using path 42 to the TCP/IP stack 28. This information comprises for instance the type of service requested, the IP address of the computer to reach and the data to transmit.

Upon reception of this information, the TCP/IP stack 28 performs the creation of the TCP/IP packets which comprises this information plus information such as checksum control. The TCP/IP stack 28 then sends to the IP/WIRELESS, WIRELESS/IP translator 29 this packet using path 44. The IP/WIRELESS, WIRELESS/IP translator 29 then checks if an ID number is available for the mobile unit 21. If not, the connection of the mobile user 21 to the wireless network, as described before, is performed. If an ID number is available, the IP/WIRELESS, WIRELESS/IP translator 29 checks in its memory if the destination IP of the packet is already known i.e. if a Sub ID number exists. If no Sub ID number exists, the IP/WIRELESS, WIRELESS/IP translator 29 transfers a packet which comprises as data the TCP/IP header of the packet to send and a wireless header. If a Sub ID exists, the wireless packet is prepared with the data part of the TCP/IP packet.

The wireless packet is sent to the data radio transceiver 30 using path 46. The radio transceiver converts this packet into a radio signal that is sent to the antenna using the antenna link 31. The signal is received by the gateway 20. The signals goes to the data radio transceiver 25 of the gateway 20. The data radio transceiver 25 of the gateway 20 converts the radio signal into a flow of data which is a packet. This packet goes to the IP/WIRELESS, WIRELESS/IP translator 23 of the gateway 20. Upon reception of the packet (step 121 FIG. 5), the IP/WIRELESS, WIRELESS/IP translator 23 sends a request to the database 24 using the path 38. This request comprises the ID and the Sub ID (if this applies) contained in the packet. The IP/WIRELESS, WIRELESS/IP translator 23 receives then from the database 24 a response (step 122 FIG. 5) which contains either TCP/IP information in the case that a Sub ID is available or a flag signaling that no IP information is available in the database 24 in the case that there is no Sub ID transmitted to the database 24. In the case that no TCP/IP information is available in the database (i.e. no Sub ID are available), a Sub ID (step 128 FIG. 5) is created. This Sub ID and the TCP/IP header information part of the data contained in the packet which comes from the data radio transceiver 25 via path 37, are sent to the database 24 (step 129 FIG. 5). This Sub ID number will be transmitted to the mobile unit 21 (step 130 FIG. 5). In the case that a Sub ID exists, TCP/IP information related to this specific Sub ID are transmitted to the IP/WIRELESS, WIRELESS/IP translator 23. A new TCP/IP header is created using this TCP/IP information and the data field contained in the radio packet. This new TCP/IP data packet is sent to the router 22 using path 35. The router routes the packet according to flexible policies determined by a user. If the packet destination is outside the wireless network i.e. in the network 19, the router checks whether the destination IP address is allowed. If so, the TCP/IP packet is sent to the network 19 using the link 33. If the packet destination is inside the wireless network, the router 22 checks in the database 24, by making a request using path 38, if the user IP exists. Furthermore, in another embodiment, the router 22 checks if the destination user, in the case that the destination user is connected, allows the source user to reach him. A way to implement that would be for instance to add a field in the database next to the destination IP address which would contains either banned addresses or authorized addresses. In the case that the destination user is a mobile unit part of the wireless network, the packet is sent to the IP/WIRELESS, WIRELESS/IP translator 23 for further processing.

Process to Send Information from the Gateway to the Mobile

When a TCP/IP packet is to be sent by the gateway 20 to a mobile unit 21, the IP/WIRELESS, WIRELESS/IP translator 23 makes a request to the database 24 using path 38. The request comprises the destination IP address. In return, the database 24 sends back the ID number to be used. If no Sub ID are related to the IP destination address, a Sub ID number is created. This Sub ID number is linked to the source IP address.

A packet which comprises this Sub ID, the ID, and TCP/IP information is created by the IP/WIRELESS, WIRELESS/IP translator 23. This packet is sent to the data radio transceiver 25 where it is converted into a radio signal which is transmitted to the antenna using the antenna link 26.

If a Sub ID related to this source TCP/IP address already exists, the ID and Sub ID numbers are retrieved from the database 24 and used with the data part of the TCP/IP packet to create a wireless header that will be used to create a wireless packet. Such wireless packet is sent to the data radio transmitter 25 using the path 36. This wireless packet is then converted into a radio signal which is sent to the antenna using the antenna link 26. This radio signal is received by all antennas of the wireless network.

Each mobile unit 21 receives this radio signal which is transmitted to the data radio transceiver 30 using the antenna link 31. The data radio transceiver 30 then converts this radio signal into a flow of information that will form wireless packets. In the preferred embodiment, this flow of information is digital. The wireless packet is then sent to the IP/WIRELESS, WIRELESS/IP translator 29. The IP/WIRELESS, WIRELESS/IP translator 29 then checks whether the ID number is the one corresponding to this particular mobile unit 21. If the ID number does not correspond to this particular mobile unit 21, the packet is discarded. If the ID number corresponds to the one of this particular mobile unit 21, the IP/WIRELESS, WIRELESS/IP translator 29 checks into its memory whether he knows the Sub ID number. If not, this means that this packet contains information to initialize a new Sub ID created by the gateway 20, in its data field. This information comprises the TCP/IP address of the source. In the case that no prior Sub ID exists, the information is uploaded in the internal memory of the IP/WIRELESS, WIRELESS/IP translator 29. If the sub ID number is contained into the memory of the IP/WIRELESS, WIRELESS/IP translator 29, the IP/WIRELESS, WIRELESS/IP translator 29 retrieves from its memory the IP parameters in order to create the TCP/IP packet using the data part of the wireless packet transmitted. This TCP/IP packet is now sent to the application 27 using path 43.

In another embodiment, the IP/WIRELESS, WIRELESS/IP translator 23 and the IP/WIRELESS, WIRELESS/IP translator 29 performs encryption/decryption and/or compression/decompression of the data part of the wireless packet. In another embodiment, the IP/WIRELESS, WIRELESS/IP translator 23 and the IP/WIRELESS, WIRELESS/IP translator 29 performs encryption/decryption and/or compression/decompression of the data part of the whole wireless packet. More precisely, the mobile unit 21 decides which encryption key will be used and transmits this information to the gateway 20. The encryption key used by one particular mobile unit 21 will be stored in the database 24 during the first connection. Thus, this allows each mobile unit 21 to have its own encryption key. The type of compression algorithm currently used is preferably sent by the gateway 20 to the mobile unit 21. This type of compression algorithm will be used between the gateway 20 and the mobile unit 21 in further communications. While these protection/compression schemes allow the transmission of the information in a public packet oriented network with a lower bandwidth, the amount of processing time on each side will larger.

In the preferred embodiment, the transmission of the data packets sent over the wireless network is managed by the IP/WIRELESS, WIRELESS/IP translator 23 on the gateway side and the IP/WIRELESS, WIRELESS/IP translator 29 on the mobile user side. The IP/WIRELESS, WIRELESS/IP translator 23 and the IP/WIRELESS, WIRELESS/IP translator 29 check the transmission of the wireless packets over the wireless network. They command their respective radio transceiver in order to synchronize communication, send acknowledgements, request reception acknowledgements in the case that the acknowledgements are not received, save wireless packets if they cannot be immediately sent.

Figure 5:
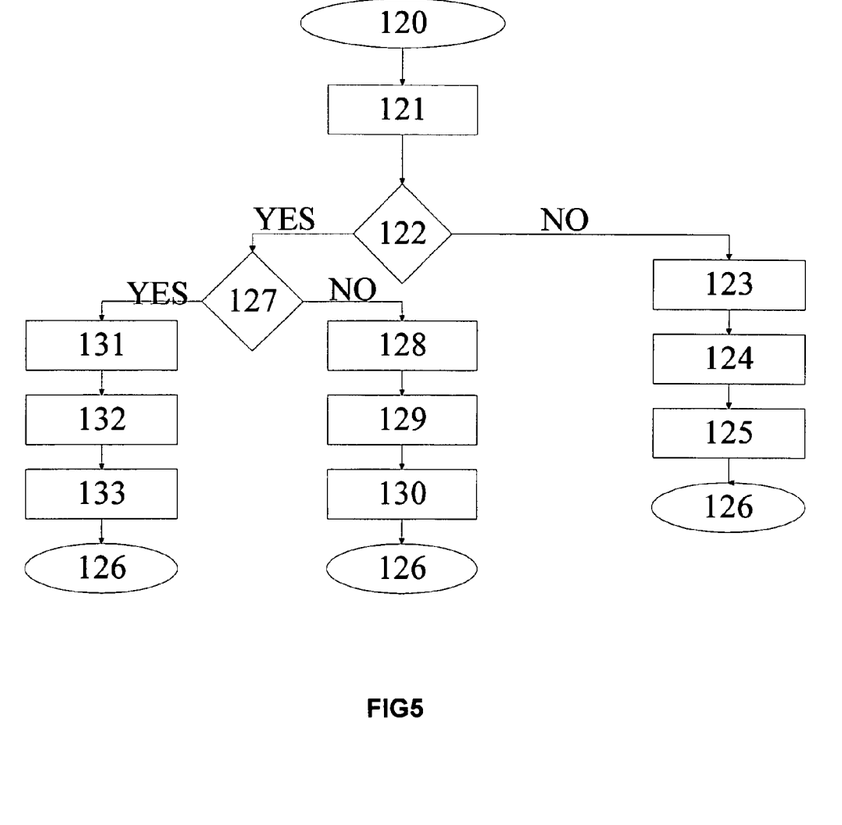
FIG. 5 shows the block diagram which represents actions performed by the gateway upon reception of a wireless packet.
Figure 6:
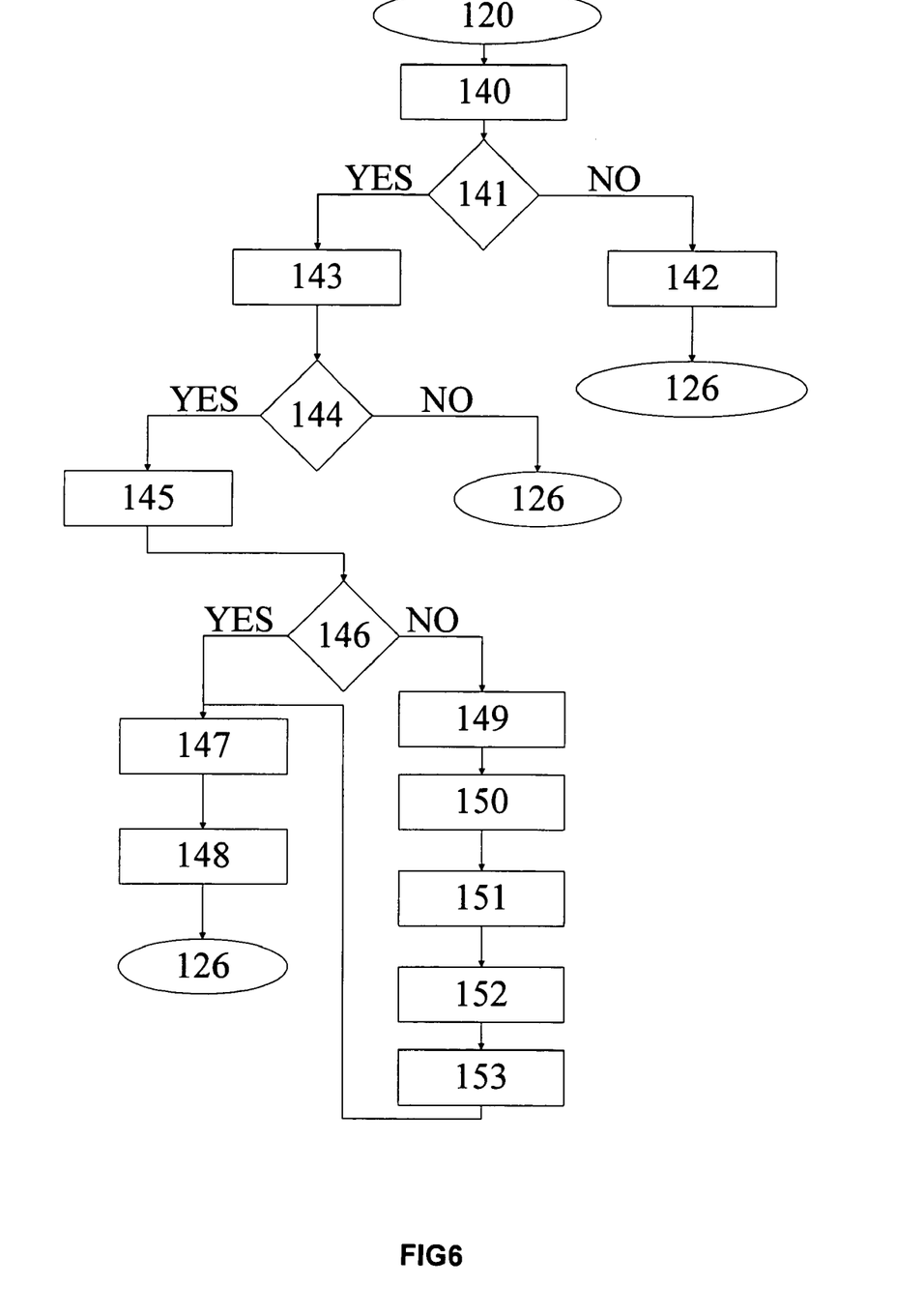
FIG. 6 shows the block diagram which represents actions performed by the gateway upon reception of a TCP/IP packet.

FIG. 5 summarizes the action performed by the WIRELESS/IP, IP/WIRELESS translator 23 when receiving a wireless packet, in the preferred embodiment. FIG. 6 summarizes the operation performed by the WIRELESS/IP, IP/WIRELESS translator 29 when receiving a TCP/IP packet.

Another Embodiment of the System Under a Microsoft Architecture

Figure 3:
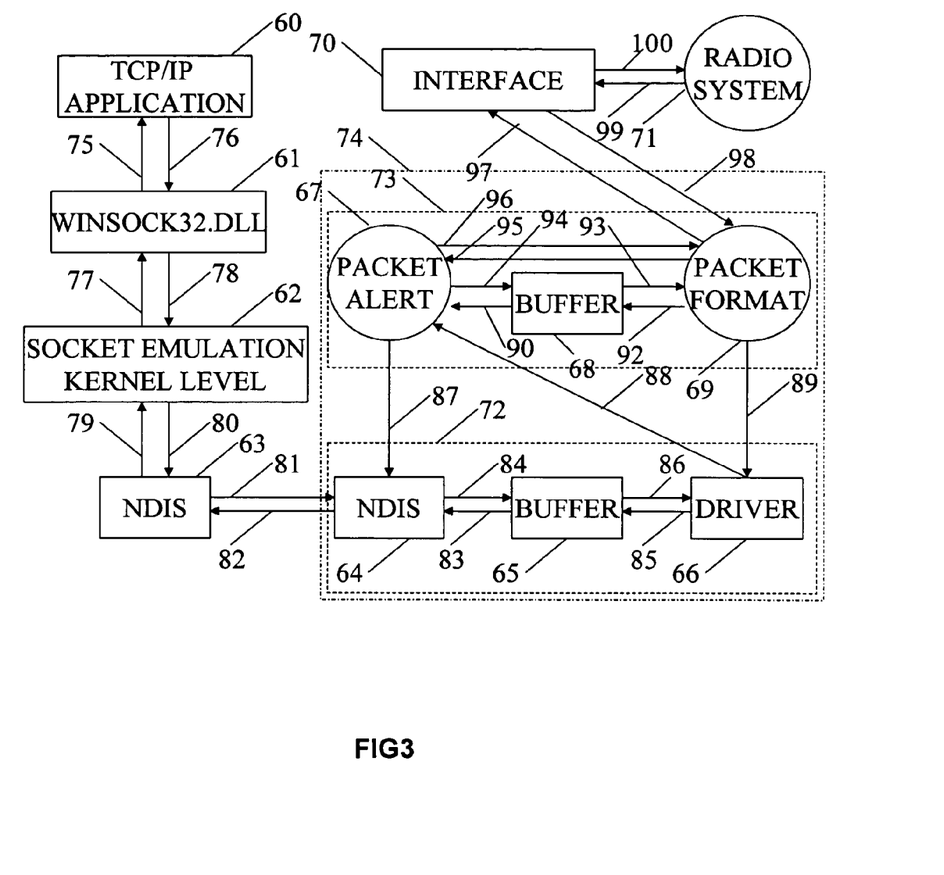
FIG. 3 shows the detailed architecture of the preferred embodiment of the invention for a mobile unit.

Now referring to FIG. 3, the complete architecture of the system is disclosed. The TCP/IP application 60 is either a client application or a server application. These applications can use either Remote Procedure Call (RPC) or Winsock library (version 1.1 and 2.0). Wsock32.dll 61 is a library provided by Microsoft. This library allows a program which uses it to select a socket and to send data using either UDP or TCP protocol to an IP address. The socket emulation kernel level 62 creates the TCP/IP packet at the kernel level of the operating system. The Network Driver Interface Specification (NDIS) 63 allows a high level of abstraction and portability under Microsoft Windows environment. In fact, more precisely, NDIS describes the interface by which one or more Network Interface Card (NIC) drivers communicates with one or more underlying network interface cards, with one or more overlying protocol drivers, and with the operating system. The invention is a network interface card which comprises a network manager 72 named RRDRV.sys and an executable application 73 named RRWIN32.exe. The network manager 72 comprises a miniport NDIS 64 which directly manages the network interface card 74. The network manager 72 also comprises a driver part 66 and a buffer 65. The network interface card 74 also comprises the executable application 73 which comprises a main thread 69, a second thread 67 and a buffer 68. The interface 70 allows the invention to be interfaced to a packet radio system 71. The main thread 69 is responsible for compressing and encoding the packets. It is also responsible for sending the packets to the packet radio system 71 via the interface 70. The second thread 67 is responsible for waiting for new packets that the NDIS 64 gives incoming traffic. More precisely, there are four types of communication between the executable application 73 and the network manager 72.

The first type of communication between the executable application 73 and the network manager 72 refers more precisely to a communication between the miniport NDIS 64 and the second thread 67. The goal of this communication is to inform the second thread 67 of the arrival of a packet on the NDIS 64. The second thread 67 does a connection to the NDIS using path 87.

The second type of communication between the executable application 73 and the network manager 72 refers more precisely to a communication between the driver 66 and the main thread 69. The main thread 69 can send data to the driver 66 using data path 89.

The third type of communication between the executable application 73 and the network manager 72 refers more precisely to a communication between the driver part 66 of the network manager 72 and the second thread 67. The second thread 67 can get data from the driver part 66 of the network manager 72 using data path 88.

The fourth type of communication is between the interface 70 and the main thread 69. The main thread 69 sends information to the interface 70 using the data path 97; the main thread 69 received information from the interface 70 using the data path 98.

In order to allow communication between the miniport NDIS 64 and the driver part 66 of the network manager 72, a buffer 65 stores temporary data. In the preferred embodiment, the buffer 65 comprises 500 single buffers of 2000 bytes length each. The buffer 65 communicates with the miniport NDIS 64 using data paths 83 and 84. The buffer 65 communicates with the driver part 66 of the network manager 72 using data paths 85 and 86.

The main thread 69 can communicate with the second thread 67. The main thread 69 does communicate with the radio system 71 via the interface 70. The main thread can also send information to the driver part 66 of the network manager 72 using data path 89.

Figure 4:
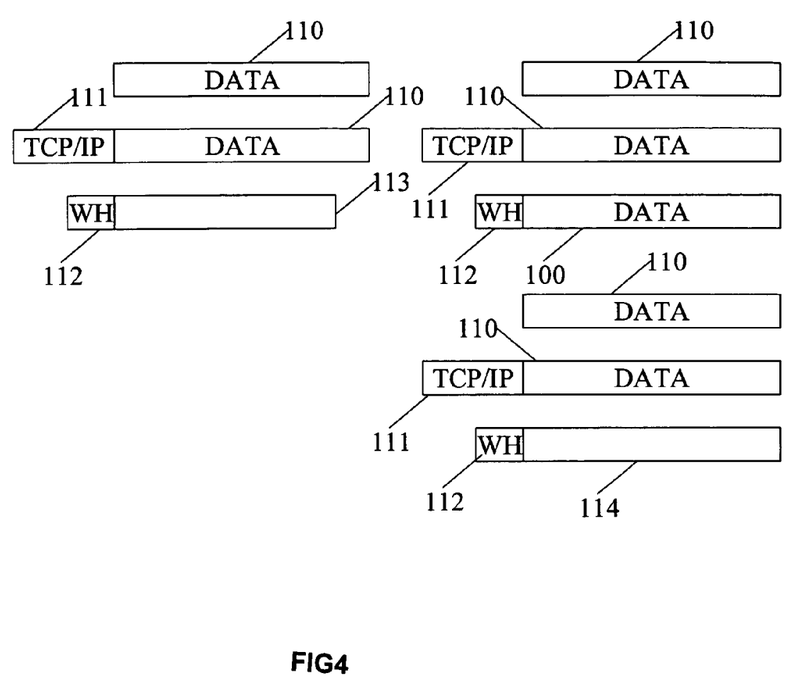
FIG. 4 shows the format of the packet that can be transferred.

Now referring to FIG. 4, there is shown examples of the format of the packet that may be transferred. For example, a data portion 110 is shown. A TCP/IP packet comprising a TCP/IP header 111 and the data portion 110 is shown. A corresponding wireless packet having a wireless header 112 is also shown. The wireless header comprises a compressed data portion 113. Another wireless packet having a data portion 100 and the wireless header 112 is shown. Alternatively, a wireless packet having the wireless header 112 and a portion 114 is also shown. Such embodiments shows that the data portion 110 may be compressed, in a wireless packet, left without any changes or encrypted as explained.

When a data packet comes from the NDIS 63 to the miniport NDIS 64 using data path 81, it is automatically stored into the buffer 65. The second thread 67 of the executable application 73 is then warned that a data packet is ready to be processed and gets the data packet from the driver part 66 of the network manager 72 using path 88 and save it to buffer 68. The second thread 67 then sends a message to the main thread 69. The main thread 69 collects the data packet from buffer 68 of the network manager 72. The main thread 69 transforms the data packet into a format suitable for the data radio system 71. In another embodiment, the main thread 69 encrypts the data part of the TCP/IP packet for security and/or authentification purposes. In another embodiment, the main thread 69 compresses the data part of the TCP/IP packet. When the TCP/IP is entirely processed, the new packet is sent to the interface 70. The interface 70 then sends the information to the radio system 71.

When a wireless packet is received in the radio system 71, it is sent to the interface 70. The main thread 69 then collects the wireless packet using data path 98. The main thread 69 then deletes the wireless header. In another embodiment, the main thread 69 then decompresses the data of the wireless packet. In another embodiment, the main thread 69 then decrypts the data of the wireless packet. The main thread 69 then creates a TCP/IP packet with the data. This TCP/IP packet is sent to the driver part 66 of the network manager 72. This TCP/IP packet is then sent to the buffer 65. The NDIS 64 then retrieves the TCP/IP packet from the buffer 65 using data path 83. The NDIS 64 can then send the TCP/IP packet to the NDIS 63.

What is claimed is:

1. A gateway for transmitting data packets between a wireless network and a second network, the gateway comprising:
    a database comprising data associating at least one wireless terminal with at least one destination address, said data including for each of said at least one wireless terminal, at least one wireless terminal identifier, at least one source address of said at least one wireless terminal according to a protocol of said second network, and at least one destination address on said second network;
    a database manager collecting information from said data packets received from said at least one wireless terminal in order to build up and maintain said database;
    a header builder receiving data packets from the wireless network without a header suitable for said protocol of said second network and building said suitable header based on said data and information contained within said data packets received, and outputting data packets with said suitable header for transmission on said second network; and
    a relay module receiving data packets from said second network addressing said at least one wireless terminal according to an address associated with said second network, said relay module retransmitting said data packets from said second network to said at least one wireless terminal using an address obtained from said database in a format of a protocol of said wireless network.

2. The gateway as claimed in claim 1 wherein said database manager responds to request messages from said at least one wireless terminal, said request messages comprise information about a communication.

3. The gateway as claimed in claim 2 wherein the response to said request messages allocates an Identification Number (ID), and said header builder reads said ID to determine said information, said ID being sent to said at least one wireless terminal.

4. The gateway as claimed in claim 3 wherein said ID has at least a Sub Identification Number (Sub-ID), said Sub ID being used when many of said at least one destination address are being simultaneously managed with a single ID for said at least one destination address to be distinguished.

5. The gateway as claimed in claim 1 wherein said database manager only stores one of said destination addresses per terminal, and automatically builds data from said header information received, said packets received with said header information being forwarded without said wireless header on said second network, said header builder building said header information for said destination address for subsequent packets not having said header information.

6. The gateway as claimed in claim 1 wherein said protocol used at said second network is TCP/IP.

7. The gateway as claimed in claim 1 wherein said relay module communicates said header into said wireless terminal using said database data and strips header information from said data packets sent to said wireless terminal.

8. The gateway as claimed in claim 7 wherein said relay module compresses said data packets prior to transmission to said wireless terminal.

9. The gateway as claimed in claim 7 wherein said relay module encrypts said data packets prior to transmission to said wireless terminal.

10. The gateway as claimed in claim 7 wherein said relay module compresses said data and information contained within said data packets to be transmitted over said wireless network.

11. The gateway as claimed in claim 7 wherein said relay module encrypts said data and information contained within said data packets to be transmitted over said wireless network.

12. The gateway as claimed in claim 7 wherein said relay module encrypts said data and information contained within said data packets to be transmitted over said wireless network using a public/private keying scheme.

13. A wireless terminal for transmitting wireless packets over a wireless network, said wireless terminal comprising:
    a header manager transmitting header information for a particular destination on a second network, and said wireless packets to said wireless network without a header suitable for a protocol used on a second network;
    a memory comprising data representing header information concerning at least one second network terminal;

a memory manager collecting information from said wireless packets received from said wireless network in order to build up and maintain said memory;

a relay module collecting said data packets, not having a header suitable for said protocol, from said wireless network to build a data packet with a header suitable for said protocol using said data.

14. The wireless terminal as claimed in claim 13 wherein said memory manager requests response messages from said wireless packets.

15. The wireless terminal as claimed in claim 14 wherein the response messages to said mobile wireless terminal gives an Identification Number (ID), and said memory manager reads said ID to determine the header information.

16. The wireless terminal as claimed in claim 15 wherein said ID has a sub identification number (Sub-ID), when many of said destinations are being simultaneously managed.

* * * * *